(12) United States Patent
Biyani et al.

(10) Patent No.: US 11,773,705 B1
(45) Date of Patent: Oct. 3, 2023

(54) CHANGING CALCIUM CARBONATE PARTICLE SIZE WITH STARCH FOR RESERVOIR FLUIDS

(71) Applicant: Halliburton Energy Services, Inc., Houston, TX (US)

(72) Inventors: Mahesh Vijay Biyani, Pune (IN); Sunita S. Kadam, Pune (IN); Sohini Bose, Houston, TX (US); Alexandra Clare Morrison, Houston, TX (US); Sudarshana Mukherjee, Pune (IN); Hui Zhou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/957,055

(22) Filed: Sep. 30, 2022

(51) Int. Cl.
*E21B 43/17* (2006.01)
*C09K 8/80* (2006.01)

(52) U.S. Cl.
CPC ............... *E21B 43/17* (2013.01); *C09K 8/80* (2013.01)

(58) Field of Classification Search
CPC .................................. E21B 43/17; C09K 8/80
See application file for complete search history.

(56) References Cited

U.S. PATENT DOCUMENTS

| | | | |
|---|---|---|---|
| 5,728,652 A | 3/1998 | Dobson, Jr. et al. | |
| 6,300,286 B1 | 10/2001 | Dobson, Jr. et al. | |
| 6,391,830 B1 | 5/2002 | Dobson, Jr. et al. | |
| 6,576,597 B2 | 6/2003 | Dobson, Jr. et al. | |
| 7,387,985 B2 | 6/2008 | Kippie et al. | |
| 8,575,541 B1 * | 11/2013 | Jamison | E21B 21/08 250/253 |
| 9,611,416 B2 | 4/2017 | Wang et al. | |
| RE47,649 E | 10/2019 | Jones et al. | |

(Continued)

FOREIGN PATENT DOCUMENTS

| | | |
|---|---|---|
| WO | 9951701 A1 | 10/1999 |
| WO | 2010011222 A1 | 1/2010 |
| WO | 2021167691 A1 | 8/2021 |

OTHER PUBLICATIONS

Filing Receipt, Specification and Drawings for U.S. Appl. No. 17/537,085, entitled "Wellbore Servicing Fluid and Methods of Making and Using Same," filed Nov. 29, 2021, 49 pages.

(Continued)

*Primary Examiner* — Silvana C Runyan
(74) *Attorney, Agent, or Firm* — Conley Rose, P.C.; Rodney B. Carroll

(57) ABSTRACT

A method of drilling a wellbore penetrating a subterranean formation, the method includes: during drilling operations, circulating in the wellbore a first aqueous drilling fluid composition including a modified starch and a calcium carbonate wherein the calcium carbonate has a first predetermined particle size; during the circulating, measuring one or more parameters to create a set of measured parameters; and during the circulating, responsive to one or more parameters of the set of measured parameters, changing the calcium carbonate with another calcium carbonate of a different particle size to obtain a second aqueous drilling fluid composition, wherein the first and second predetermined particle sizes are, independently, a $d_{50}$ particle size of about 1.0 μm to about 150 μm.

20 Claims, 2 Drawing Sheets

(56) References Cited

U.S. PATENT DOCUMENTS

| | | | |
|---|---|---|---|
| 10,934,469 | B2 | 3/2021 | Walker et al. |
| 11,091,682 | B2 | 8/2021 | AlBahrani et al. |
| 2004/0157748 | A1 | 8/2004 | Dino |
| 2005/0155761 | A1 | 7/2005 | Blauch et al. |
| 2011/0113983 | A1 | 5/2011 | Bernu et al. |
| 2012/0298357 | A1 | 11/2012 | Ezell et al. |
| 2013/0029883 | A1 | 1/2013 | Dismuke et al. |
| 2014/0069645 | A1* | 3/2014 | Hartman ............ C09K 8/04 507/224 |
| 2014/0299325 | A1 | 10/2014 | Zelenev et al. |
| 2015/0292279 | A1* | 10/2015 | Wang ............ E21B 21/003 166/293 |
| 2016/0060505 | A1 | 3/2016 | Zelenev et al. |
| 2016/0312551 | A1* | 10/2016 | Rowe ............ E21B 7/00 |
| 2018/0201820 | A1 | 7/2018 | Eyaa Allogo et al. |
| 2019/0100689 | A1 | 4/2019 | Zelenev et al. |
| 2020/0172787 | A1* | 6/2020 | Zhou ............ C09K 8/74 |
| 2021/0062064 | A1 | 4/2021 | Deville et al. |
| 2021/0148210 | A1 | 5/2021 | Nguyen et al. |
| 2021/0363870 | A1 | 11/2021 | Fan et al. |
| 2021/0396098 | A1* | 12/2021 | Morrison ............ E21B 37/08 |
| 2022/0220358 | A1 | 7/2022 | Santos et al. |

OTHER PUBLICATIONS

Filing Receipt, Specification and Drawings for U.S. Appl. No. 17/850,438, entitled "Downhole Tool For Detecting Features in a Wellbore, a System, and a Method Relating Thereto," filed Jun. 27, 2022, 51 pages.

Barabuf Material Safety Data Sheet, Halliburton, Nov. 30, 2012, 6 pages, Halliburton/Baroid Australia Pty. Ltd.

Baracarb 50 Safety Data Sheet, Halliburton, Jun. 22, 2015, 8 pages, Halliburton New Zealand.

Model 6100 Formation Response Tester, Reservoir Analysis, Chandler Engineering, 2018, 2 pages, AMETEK.

Qualitative Tier 2 Assessment: Monoethanolamine, EHS Support, Oct. 2021, 33 pages, Santos, Ltd.

Permeability Plugging Apparatus, Drilling Fluids Product Information, Fann Instrument Company, 2013, 2 pages, Fann Instrument Company.

Zhou, Hui et al., "Novel High Density Brine-Based Drill-In Fluids Significantly Increased Temperature Limit for HP/HT Applications," SPE/IADC Drilling Conference and Exhibition held in London, Mar. 17-19, 2015, SPE/IADC-173075-MS, 13 pages, Society of Petroleum Engineers.

Morrison, Alexandra et al., "Development of a New Reservoir Drilling Fluid to Achieve Matrix Injection," ADIPEC, 2022, SPE-211542-MS, 12 pages, Society of Petroleum Engineers.

\* cited by examiner

CHANGING CALCIUM CARBONATE PARTICLE SIZE WITH STARCH FOR RESERVOIR FLUIDS

TECHNICAL FIELD

Embodiments of the disclosure are directed to a method of drilling a wellbore penetrating a subterranean formation. More particularly, the method includes drilling the wellbore to a first location while circulating a first drilling fluid composition having a bridging agent with a first predetermined particle size and drilling the wellbore to a second location while circulating a second drilling fluid composition having a bridging agent with a second predetermined particle size.

BACKGROUND

Wellbores are drilled into the earth for a variety of purposes including tapping into hydrocarbon bearing formations to extract the hydrocarbons for use as fuel, lubricants, chemical production, and other purposes. In order to enhance the recovery of hydrocarbons from a formation or wellbore, an operational technique, such as a secondary recovery, can include drilling with a drilling fluid one or more injector wells proximate to a production well for injecting a treatment fluid to increase yield from the production well. If possible, injector well production costs could be minimized by achieving the desired level of return injectivity without using backflow by optimizing drilling fluids.

Drilling fluids can specifically be designed to minimize formation damage and facilitate wellbore cleanup. Drilling fluids can include a continuous phase, one or more bridging solids, one or more viscosifiers, and one or more fluid loss control agents. Typical water-based drilling fluids use brines to achieve a desired fluid density and may rely on suitable solids for bridging pore spaces. A drilling fluid for an injector well can include one or more polysaccharides, such as xanthan gum or diutan gum as a viscosifier and a starch as a fluid loss control agent. These drilling fluids can have shortcomings with respect to dissolution of residue, e.g., filter cake. The polysaccharides may provide the requisite rheology during drilling, however, during cleanup, e.g., using a slow release organic acid for acid treatment, xanthan and diutan polymer chains may cause dissolution difficulty even in the presence of an internal peroxide-based breaker, and thus, can result in poor return injectivity hindering efficient hydrocarbon production from a corresponding production well. Typically, use of only starch fails to provide desired rheology during drilling.

Shortcomings of current drilling fluids for injector wells fail to provide the required properties for drilling as well as the easy removal of filter cake for satisfactory return injectivity performance. Some brine-based fluid systems using xanthan gum, a viscosifier, and fluid loss additives may fail to perform due to poor fluid properties during drilling and subsequent lowered return injectivity after cleanup.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
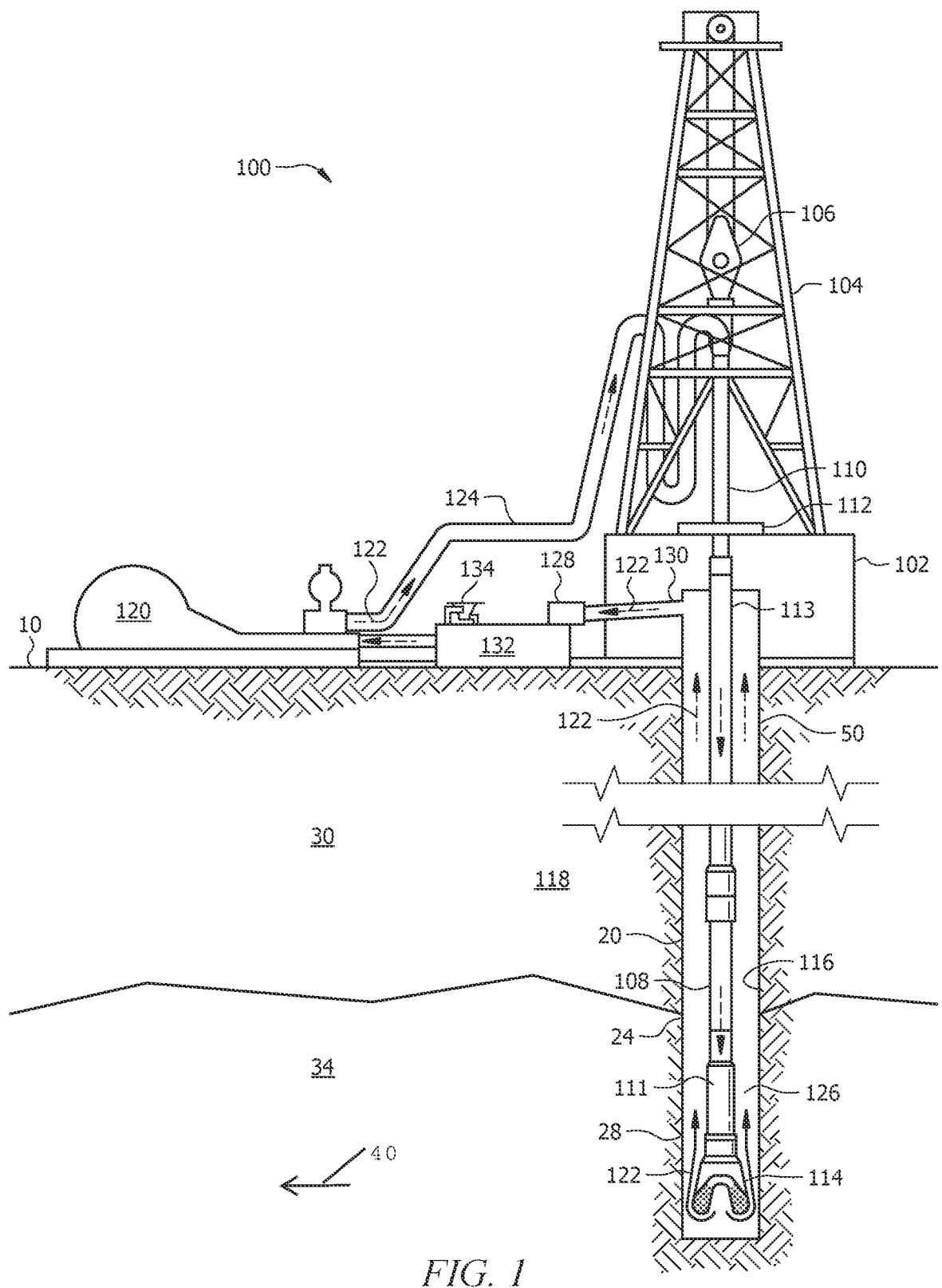
FIG. 1 is a schematic diagram of an exemplary drilling assembly.

In the following detailed description of the illustrative embodiments, reference is made to the accompanying drawings that form a part hereof. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Substantially similar or identical elements in the drawings may be identified by the same numeral to reduce redundancy.

As used herein, the term "fluid path" can be a path formed by a wellbore and can be used for the production of fluids, such as hydrocarbons and water, or be used for the injection of fluids, such as water, carbon dioxide, and natural gas, e.g., methane.

As used herein, the term "stability" can refer to properties associated with a drilling fluid such as rheology, fluid loss, and top brine separation for static aging. Good stability can mean that the fluid can still maintain properties after aging by hot-rolling and static aging.

As used herein, the term "substantially constant" such as a substantially constant amount, can mean within about 10%, about 5%, or even about 1% of the referenced item, such as within about 10%, about 5%, or even about 1%, by weight, of an amount.

As used herein, the term "coupled" can mean two items, directly or indirectly, joined, fastened, associated, connected, communicated, or formed integrally together either by chemical or mechanical means, by processes including extruding, stamping, molding, or welding. What is more, two items can be coupled by the use of a third component such as a mechanical fastener, e.g., a screw, a nail, a staple, or a rivet; an adhesive; or a solder.

As used herein, the term "and/or" can mean one or more of items in any combination in a list, such as "A and/or B" means "A, B, or the combination of A and B".

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

In any embodiment, an injector well can be formed by drilling into a subterranean formation. During drilling, a filter cake can be formed in the wellbore to prevent the loss of the drilling fluid into the surrounding formation. In any embodiment, one type of drilling fluid is a drill-in fluid that is typically used when drilling within a hydrocarbon producing or fluid production zone of a formation. Once the drill finishes forming the wellbore, the filter cake can be removed to allow injection of fluid into the formation. The filter cake may be removed with a fluid containing an acid breaker. After treating with an acid breaker, treatment fluids can be injected and pass into the formation to drive, e.g., hydrocarbons, towards a production well.

Often, the drilling fluid, or drilling fluid composition can include a modified starch and a bridging agent including a calcium carbonate, a magnesium carbonate, a magnesium oxide, a manganese tetroxide, an ilmenite, or a combination thereof having a first particle distribution range. Typically, drilling occurs in the non-production zone of the formation. The drilling can continue to a production zone of the subterranean formation. At this point, a drill-in fluid may be used having the particle size distribution of the bridging agent, such as calcium carbonate, altered by substituting a calcium carbonate having a second particle size distribution (PSD) different from the first particle size distribution of the previous calcium carbonate. A median particle size ($d_{50}$) can be indicative of PSD of a bridging agent, such as calcium carbonate. As this change occurs, the composition of the drilling fluid can change over a period of time from a first composition to a second transitional composition with a mixture of PSD. Continuing to provide the second calcium carbonate at the surface can result over another period of time in a third calcium carbonate composition (substantially matching the second PSD of the second calcium carbonate provided at the surface) in the subterranean formation, and in any embodiment, in the production zone. In any embodiment, an amount of bridging agent, such as calcium carbonate, may also be changed as the drill moves from the non-production zone to the production zone.

The bridging agent, such as calcium carbonate, can be substituted during drilling by a bridging agent having a different particle size distribution. This change can be conducted in response to one or more formation parameters or one or more aqueous drilling fluid parameters. The one or more formation parameters can include a well depth, a formation porosity, a formation pore throat size, a formation pressure, a formation temperature, or a combination thereof. The one or more aqueous drilling fluid parameters can include a fluid rheology, a top brine separation after static aging, a low temperature and low pressure (LTLP) fluid loss, a high temperature and high pressure (HTHP) fluid loss, a permeability plugging apparatus fluid loss or a combination thereof.

In any embodiment, a fluid, such as the drilling fluid, can, if possible, be based on the combination of a modified starch, optionally serving as at least one of a viscosifier and a fluid loss agent, and a sized calcium carbonate, optionally serving as a bridging agent. The synergistic effect of the modified starch and the sized calcium carbonate can successfully provide the required fluid properties as well as sufficient return injectivity. Thus, to achieve the required properties and performance of an injector fluid, a non-damaging product (such as a modified starch, acid-soluble inorganic compounds, etc.) is typically desired that can provide the appropriate viscosity as well as sufficient flow loss properties.

Generally, degradable polymeric additives in an optimized concentration to balance the rheological properties (fluid stability) can achieve a sufficient return injectivity. Other than the fluid rheology, other properties, such as LTLP fluid loss, HTHP fluid loss, top brine separation after static aging, and fluid loss based on permeability plugging apparatus (PPA) testing, can be optimized based on the selection of different sized calcium carbonate.

Modified starches can be those derived from natural starches by chemical reaction of a natural starch with a suitable organic reactant. Examples of suitable modified starches include, but are not limited to, a carboxymethyl starch, a hydroxyethyl starch, a hydroxypropyl starch, an acetate starch, a sulfamate starch, a phosphate starch, a nitrogen modified starch, a starch crosslinked with one or more crosslinking agents or multi-functional agents with at least one aldehyde, epichlorohydrin, borate; phosphate, ether, and a combination thereof, and a starch grafted with at least one acrylonitrile, acrylamide, acrylic acid, methacrylic acid, maleic anhydride, styrene, and a combination thereof. In any embodiment, the modified starch, such as a modified starch ether or ester, can be reacted, e.g.; carboxymethylated, crosslinked, hydroxypropylated, acetylated, ethylated, phosphated, sulfated, graft derived, methylated, or a combination thereof, with various chemical agents, Exemplary modified starch ethers and esters include carboxymethylated starch, hydroxypropylated starch, and hydroxypropylated carboxymethyl crosslinked starch.

In an embodiment, the starch can be present in the drilling fluid in an amount effective to provide sufficient rheology. Effective amounts may be determined by one of ordinary skill in the art.

A bridging agent can include, but are not limited to, a calcium carbonate, a sized marble, a magnesium oxide, a magnesium carbonate, an iron carbonate, an ilmenite, a hematite, a manganese tetroxide, a sized sodium chloride, a sized potassium chloride, a combination thereof, and any suitable hydrate or combinations thereof. Generally, the bridging agent particle size may range from about 1 micron to about 600 microns but may vary from formation to formation. Alternatively, the bridging agent particle sizes may range from about 1 micron to about 100 microns, from about 3 microns to about 50 microns, from about 5 microns to about 40 microns, from about 5 microns to about 30 microns, or from about 5 microns to about 25 microns. The particle size used may be determined by the pore throat size of the formation. In any embodiment, the bridging agent can include calcium carbonate optionally including a silica such as quartz. In any embodiment, the predetermined particle size can be a $d_{50}$ particle size of about 1.0 μm to about 150 μm, a $d_{50}$ particle size of about 2.0 μm to about 150 μm, a $d_{50}$ particle size of about 2.0 μm to about 100 μm, a $d_{50}$ particle size of about 3.0 μm to about 80 μm, a $d_{50}$ particle size of about 4.0 μm to about 50 μm, a $d_{50}$ particle size of about 5.0 μm to about 30 μm, or the predetermined particle size is a $d_{50}$ particle size of about 7.0 μm to about 25 μm.

In any embodiment, the method and/or drilling fluid can provide the required fluid properties as well as good return injectivity under the given formation conditions. In any embodiment, the fluid system can mitigate the issues associated with current brine based fluids and can serve as a drill-in fluid. In any embodiment, the method can provide direct return injectivity without utilizing flowback. Often, the number of injector wells can increase as fields age and formation pressure decreases. Typically, initiating injection wells directly without added time and thereby reducing cost by omitting flow back to initiate production. The fluid can improve drilling fluid technology and enhance drilling capabilities, and polysaccharides, such as xanthan gum and diutan gum, may be excluded.

In any embodiment, drilling fluids can include a xanthan gum, a diutan gum, or a combination thereof, and may fail to provide the required performance for injector wells due to, not wanting to be bound by theory, their poor solubility in acids. A drilling fluid can be comprised or consist of starch-based products that can provide both rheological and other properties, such as top brine separation after static aging and fluid loss properties, to the fluid as well as good return injectivity. In any embodiment, the starch-based products can be controlled with synthesis and modification of various starches.

Controlling fluid properties can use the synergistic effect of starch and calcium carbonate with formulating the fluid by varying the particle size distribution of calcium carbon, as described hereinafter. The formulations with higher concentration of small sized calcium carbonate in the formulation displayed the higher values for low end rheology as well as yield point. The increase in particle size of the calcium carbonate in the fluid formulation lowers the low-end rheology as well as yield point. As an example, smaller particles can create a thicker fluid while larger particles can create a thinner fluid. Thus, the fluid rheology can be adjusted by using the optimal concentration of sized calcium carbonate depending on conditions. The fluid formulated with modified starch and optimized concentration of calcium carbonate can provide sufficient return injectivity of greater than about 70% compared to fluids based on diutan gum and starch. Adjusting the particle size distribution of the calcium carbonate can be applied to other water-based fluid optimization for desired fluid properties. Thus, adjusting the particle size distribution of the calcium carbonate during drilling can serve as a rheology modifier for any fluid system. In any embodiment, the variation of particle size of the calcium carbonate in the fluid formulation may have a profound effect on fluid's low end rheological properties. The change of calcium carbonate particle size distribution can easily vary the value of 6 revolutions per minute (rpm) reading from 3 to 20, as discussed hereinafter.

In any embodiment, the drilling fluid may optionally include an oil, although the drilling fluid is typically often aqueous. Examples of suitable oils that may be included in the drilling fluid may include, but are not limited to at least one oil selected from the group including alkanes olefins, alkynes, aromatics, tall oil crude oil, light cycle oil, synthetic ester oil, diesel, cycloalkane, liquefied petroleum gas, kerosene, gas oil, fuel oil, paraffin oil, mineral oil, refined oil, low-toxicity mineral oil, ester, amide, synthetic oil, polydiorganosiloxane, siloxane, organosiloxane, ether, dialkylcarbonate, vegetable oil, biodiesel, renewable diesel, and combinations thereof. In any embodiment, the oil includes a synthetic oil.

In any embodiment, the oil may be present in the drilling fluid in an amount of from about 1 vol. % to about 40 vol. % based on the total volume of the drilling fluid, alternatively from about 5 vol. % to about 40 vol. %, or alternatively from about 5 vol. % to about 35 vol. %.

In any embodiment, the drilling fluid can include an aqueous fluid. Generally, the aqueous fluid may be from any source, provided that it does not contain an amount of components that may undesirably affect the other components in the drilling fluid. For example, the aqueous fluid can be selected from a group including essentially of fresh water, surface water, ground water, produced water, salt water, sea water, brine (e.g., underground natural brine, formulated brine, etc.), and combinations thereof. In some aspects, the aqueous fluid includes a brine. In one or more aspects, the brine includes monovalent or divalent salts such as, without limitation, at least one salt selected from the group including sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, potassium acetate, sodium acetate, and combinations thereof. A formulated brine may be produced by dissolving one or more soluble salts in water, a natural brine, or sea water.

The brine can be a saturated or an unsaturated brine. The salt may be present in the brine in any amount to form a saturated solution or supersaturated solution. For example, the salt may be included in an amount of about 1% to about 70% by weight of the brine. Alternatively, about 1% to about 5% by weight, about 5% to about 10% by weight, about 10% to about 15% by weight, about 15% to about 20% by weight, about 20% to about 25% by weight, about 25% to about 30% by weight, about 30% to about 35% by weight, about 35% to about 40% by weight, about 40% to about 45% by weight, about 45% to about 50% by weight, or about 10% to about 30% by weight. The brine can reduce dilution and/or volume of the drilling fluid, thus reduces waste volumes.

The aqueous fluid can be present in the drilling fluid in an amount effective to provide a pumpable slurry, such as a slurry having desired (e.g., job or service specific) rheological properties. In aspects, the aqueous fluid is present in the drilling fluid in an amount of from about 50 vol. % to about 99 vol. % based on the total volume of the drilling fluid, alternatively from about 50 vol. % to about 95 vol %, or alternatively from about 50 vol. % to about 90 vol. %.

In any embodiment, the drilling fluid does not include a separate viscosifier, such as a polysaccharide, particularly a xanthan gum and/or a diutan gum, besides the modified starch. In any other embodiment, the drilling fluid may optionally further include a viscosifier. The viscosifier can include a biopolymer, a synthetic polymer, minerals, or a combination thereof. The minerals can include sepiolite, attapulgite, bentonite, sodium bentonite, montmorillonite, beidellite, nontronite, hectorite, samonite, smectite, kaolinite, serpentine, illite, chlorite, montmorillonite, saponite, fuller's earth, attapulgite, laponite, or combinations thereof. In some aspects, the viscosifier includes a hydroxyethyl cellulose, a hydroxy-propyl guar, a carboxy-methyl-hydroxy-propyl guar, one or more modified polysaccharides, a partially hydrolyzed polyacrylamide (PHPA), a carboxymethylcellulose, a polyanionic cellulose, a guar gum, a locust bean gum, a Karaya gum, a gum tragacanth, one or more hydrophobically modified guars, one or more high-molecular weight polysaccharides composed of mannose and galactose sugars, one or more heteropolysaccharides obtained by the fermentation of starch-derived sugars, xanthan, one or more pectins, diutan, welan, gellan, scleroglucan, chitosan, dextran, one or more substituted or unsubstituted galactomannans, a starch, a cellulose, one or more cellulose ethers, one or more carboxycelluloses, a hydroxypropyl cellulose, one or more carboxyalkylhydroxyethyl celluloses, a carboxymethyl hydroxyethyl cellulose, a methyl cellulose, a sodium polyacrylate, a polyacrylamide, a partially hydrolyzed polyacrylamide, a polymethacrylamide, a poly(acrylamido-2-methyl-propane sulfonate), a poly (sodium-2-acrylamide-3-propylsulfonate), one or more copolymers of acrylamide and acrylamide-2-methyl-propane sulfonate, one or more terpolymers of acrylamide-2-methyl-propane sulfonate, an acrylamide and vinylpyrrolidone or itaconic add, sepiolite, attapulgite, or combinations thereof.

In any embodiment, the viscosifier has a number average molecular weight in a range of from about 1.2 million (MM) atomic mass unit (Da) to about 5 MM Da, alternatively from about 1.5 MM Da to about 4.5 MM Da, or alternatively from about 2 MM Da to about 4 MM Da.

In one or more aspects, the viscosifier is in the drilling fluid in an amount of from about 0.001 weight percent (wt. %) to about 3 wt. %, based on the total weight of the drilling fluid, alternatively from about 0.01 wt. % to about 2.5 wt. %, or alternatively from about 0.1 wt. % to about 2.0 wt. %.

In any embodiment, the drilling fluid may further include one or more additives. The one or more additives can include a rate of penetration enhancer, a spotting fluid, a sweeping agent, a deflocculant, a degreaser, a buffer, such as a pH buffer including, e.g., magnesium oxide, a wetting agent, a lubricant, a shale inhibitor, a friction reducer, a strength-stabilizing agent, an emulsifier, an expansion agent, a salt, a fluid loss agent, a vitrified shale, a thixotropic agent, a dispersing agent, a weight reducing additive (e.g., one or more hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, one or more latex emulsions, a formation conditioning agent, one or more elastomers, at least one of a gas and fluid absorbing material, one or more resins, one or more superabsorbers, one or more mechanical property modifying additives (i.e. one or more carbon fibers, one or more glass fibers, one or more metal fibers, one or more mineral fibers, one or more polymeric elastomers; one or more latexes, etc.), one or more inert particulates, a biopolymer, a polymer, a fumed silica, a fluid control additive, one or more particulate materials, one or more acids, one or ore bases, one or more mutual solvents, one or ore corrosion inhibitors, one or more conventional breaking agents, one or more relative permeability modifiers, a lime one or more clay control agents, one or more fluid loss control additives, one or more flocculants, one or more water softeners, one or more foaming agents, one or more oxidation inhibitors, one or more thinners, one or more scavengers, one or more gas scavengers, one or more lubricants, one or more bridging agents, a foam stabilizer, one or more catalysts, one or more dispersants, one or more breakers, an emulsion thinner, an emulsion thickener, a pH control additive, one or more lost circulation additives, one or more buffers, one or more stabilizers, such as amines and quaternary amines for inhibiting shale hydration swelling, one or more chelating agents, one or more oxidizers, a clay, one or more reducers, a consolidating agent, a complexing agent a sequestration agent, a control agent, an oxidative breaker, and the like, or combinations thereof. The oxidative breaker can include a bromate, a persulfate, a perborate, and a perbromate, for example. With the benefit of this disclosure, one of ordinary skill in the art should be able to recognize and select one or more suitable optional additives for use in the drilling fluid.

In any embodiment, the one or more additives are present in the drilling fluid in an amount of from about 0.001 wt. % to about 50 wt %, based on the total weight of the drilling fluid alternatively from about 0.1 wt % to about 50 wt. %, or alternatively from about 1 wt % to about 40 wt. %.

Plastic viscosity can be the viscosity when extrapolated to infinite shear rate, e.g., the slope of the shear stress/shear rate line above a yield point. The yield point refers to the resistance of a fluid to initial flow, or represents the stress required to start fluid movement. In any embodiment, the plastic viscosity and yield point can be calculated from the rheology data, e.g., with the plastic viscosity determined at dial readings of 600 and 300 rpm and the yield point at a dial reading 300 rpm. The drilling fluid disclosed herein can have any suitable plastic viscosity and yield point. At about 30 degrees Fahrenheit (° F.) to about 180° F. the drilling fluid can have a plastic viscosity of from about 1 centipoise (cP) to about 500 cP, alternatively from about 1 cP to about 400 cP, or alternatively from about 1 cP to about 300 cP. In any embodiment, the aqueous drilling fluid can include a plastic viscosity of about 5 cP to about 40 cP or about 10 cP to about 20 cP. At about 120° F. the drilling fluid can have a plastic viscosity of from about 1 cP to about 60 cP, alternatively from about 1 cP to about 40 cP, or alternatively from about 1 cP to about 20 cP. At about 30° F. to about 180° F. the drilling fluid can have a yield point of from about 1 pound (lb)/100 foot-squared ($ft^2$) to about 100 lb/100 $ft^2$ alternatively from about 2 lb/100 $ft^2$ to about 90 lb/100 $ft^2$ alternatively from about 3 lb/100 $ft^2$ to about 60 lb/100 $ft^2$, or alternatively from about 5 lb/100 $ft^2$ to about 50 lb/100 $ft^2$. In any embodiment, the drilling fluid can have a yield point of from about 2113/100 $ft^2$ (0.1 kilogram per meter squared ($kg/m^2$)) to about 200 lb/100 $ft^2$ (10 $kg/m^2$), or a yield point of from about 10 lb/100 $ft^2$ to about 50 lb/100 $ft^2$. The plastic viscosity and yield point can be calculated using Bingham Plastic model.

The drilling fluid disclosed herein can have any suitable value of pH. In any embodiment, the drilling fluid has a pH of from about 7 to about 11 at room temperature (about 70° F.), alternatively from about 7 to about 10.5, or alternatively from about 8 to about 10.

In any embodiment, the drilling fluid can have a total fluid loss of from about 0 milliliter (mL) to about 20 mL after 30 minutes, when measured in accordance with test standard API-RP-13B-1. Alternatively, the total fluid loss is from about 0 mL to about 15 mL after 30 minutes, alternatively from about 0 mL to about 10 mL after 30 minutes, or alternatively from about 0 mL to about 7 mL after 30 minutes. All total fluid loss tests, including ambient and high temperature, high pressure (HTHP) conditions, can be measured in accordance with test standard API-RP-13B-1. Fluid loss can also be determined by a permeability plugging apparatus (PPA), One such apparatus is sold by Fann Instrument Company of Houston, Tex.

In any embodiment, the total fluid loss includes an oil layer in an amount of from about 0 mL to about 10 mL after 30 minutes, alternatively from about 0 mL to about 7 mL after 30 minutes, or alternatively from about 0 mL to about 5 n L after 30 minutes. The oil layer includes oil that is separated from the drilling fluid in the fluid loss test.

In any embodiments hot rolling is performed to the drilling fluid at a temperature between about 75 to about 300° F. for about 16 hours to about 24 hours. In any embodiment, hot rolling can be conducted by adding the drilling fluid into an aging cell and putting the aging cell in a roller oven at elevated temperatures for a specific amount of time. In some other aspects, the drilling fluid undergoes static aging at temperature between about 75 to about 300° F. for about 24 hours. In any embodiment, static aging is conducted by adding the drilling fluid into an aging cell and, instead of rolling, setting in a vertical position and placed in an oven at elevated temperature for a specific amount of time. After static aging, the amount of clear brine separating out from the mud can be measured as brine separation.

The drilling fluid can have a rheology reading of from about 2 to about 200 at about 120° F. to about 150° F., atmospheric pressure, and 3 revolutions per minute (rpm) to 600 rpm, alternatively from about 3 rpm to about 150 rpm, alternatively from about 4 rpm to about 100 rpm, or alternatively from about 5 rpm to about 90 rpm, when measured in accordance with test standard API-RP-13B-1 before and after the hot rolling, and after the static aging. In one or more aspects, the drilling fluid has a rheology reading of from about 3 to about 20 at about 120° F. to about 150° F., atmospheric pressure, and 3 rpm to 6 rpm, alternatively from about 3 to about 15, alternatively from about 4 to about 15, or alternatively from about 5 to about 15, when measured in accordance with test standard API-RP-13B-1 before and after hot rolling, and after static aging.

The drilling fluid can provide any suitable return injectivity after being treated with a breaker solution. Return injectivity performance can be measured by a flow through test or a formation damage test. The flow through test can be a preliminary test to measure the return injectivity using a ceramic disc with a set-up including a pressure inlet, a reservoir tank, a high temperature and a high pressure (HTHP) cell, and a fluid collector. The initial flow rate can be measured by measuring the time required to flow through, e.g., 200 ml, of an oil or water from reservoir tank at, e.g., 5 pound per square inch absolute (psi) pressure in an injection direction. This time can be recorded in seconds to determine the initial injection rate. Filter cake can accumulate on the ceramic disc at test temperature for a specified duration and differential pressure using, e.g., 500 psi for 1 to 4 hours with a drilling fluid density of 9.8 pound per gallon (ppg or lb/gal).

After the filter cake accumulates, the HTHP cell can be cooled down at room temperature. Once cooled, the mud can be poured out from top end ensuring not to disturb the filter cake. A breaker solution, such as an in-situ acid generating breaker fluid (including desired concentration of acid breaker to dissolve the filter cake), can be carefully poured in an amount, such as 110 milliliter (ml), into the cell. The top cap can be placed and applied, e.g., 500 psi, pressure to HTHP cell containing the breaker fluid with the filter cake. The pressurized HTHP test cell can be placed in an oven at test temperature for specified soak test duration. After the breaker soak is completed, the cell can be cooled at room temperature.

After cooling the HTHP cells at room temperature, the oil or water from the reservoir tank can be flowed through the HTHP cell with, e.g., 5 psi, pressure. The time (in seconds) required for 200 ml of oil or water at 5 psi pressure can be measured in the injection direction. This step can be conducted until the flow time stabilizes for at least three repeats. This is the final injection rate in seconds. The return injectivity can be calculated with following formula.

$$\text{Return Injectivity (\%)} = \frac{\text{Initial Injection Rate, sec}}{\text{Final Injection Rate, sec}} \times 100$$

The formation damage test can assess the potential of formation damage of the drilling fluid. First, a formation response tester sold under the trade designation Model 6100 by AMTEK Chandler Engineering of Broken Arrow, Oklahoma with a sand core, e.g., Berea sandstone core, with a 1.5 inch (-in) diameter and 3-in length and a 9.8 pound mass per gallon (-lbm/gal) drilling fluid can be used. The Berea sandstone can have an estimated brine permeability of approximately 70 millidarcy (md). The core can be weighed and dimensions may be taken for pore volume calculation. The core may be vacuum saturated overnight in 7% potassium chloride brine, reweighed, and porosity and pore volume calculated. The core plug may be mounted in the tester and sealed with, e.g. 1,500 psi, confining pressure. The temperature may be raised to 178° F., maintaining confining pressure at 1,500 psi. The backpressure (pore pressure) can be applied at 200 psi. The flow of 7% potassium chloride brine can begin in the injection direction and continued at a constant flow rate of 3.0 milliliter per minute (mL/min) until the pressure drop may reach a constant value. At this point, the initial permeability can be taken. The 7% potassium chloride brine may be displaced with the drilling fluid on the injection side of the core. The core may be exposed to the test fluid for four hours dynamically at 1.2 liter per minute (L/min). Differential pressure can be 500 psi. The leakoff through the core may be measured versus time. The test fluid can be displaced from the unit with a 10.0-lbm/gal sodium bromide brine. The fluid can be displaced with an acid breaker solution of 15% by volume in 10.0-lbm/gal sodium bromide brine. The breaker solution can then be held statically for a total exposure time of 96 hours at 178° F. at 200 psi pore pressure, zero differential pressure. The breaker solution can be displaced by the 7% potassium chloride brine and flow may be resumed in the injection direction at a constant flow rate of 3.0 milliliter per minute (mL/min). The flow can be continued until the differential pressure may again be a constant value. The final permeability may be taken and regain permeability may be calculated.

The drilling fluid disclosed herein can have any suitable density, including, but not limited to, in a range of from about 4 pound per gallon (lb/gal) to about 25 b/gal, alternatively from about 7 lb/gal to about 20 lb/gal, alternatively from about 10 lb/gal to about 20 lb/gal, or alternatively from about 12 lb/gal to about 18 lb/gal. In any embodiment, the density can be reduced by various methods, such as adding hollow microspheres, low-density elastic beads, or other density-reducing additives known in the art. In some aspects the density may be reduced during production of the drilling fluid prior to placement in a subterranean formation.

A drilling fluid of the type disclosed herein can be prepared using any suitable method, such as batch mixing or continuous mixing. In one or more aspects, the method includes mixing components (e.g. the aqueous fluid, the modified starch, the calcium carbonate, and optional one or more additives) of the drilling fluid using mixing equipment (e.g., a jet mixer, re-circulating mixer, a batch mixer, a blender, a mixing head of a solid feeding system) to form a pumpable slurry (e.g., a homogeneous fluid). For example, all components of the drilling fluid may be added to a batch mixer and agitated until the desired amount of mixing is achieved. Alternatively, the drilling fluid may be added to a continuous mixer where components are metered in and a product of the drilling fluid is continuously withdrawn. The drilling fluid may be mixed at elevated temperatures to aid in blending of the components and to produce a drilling fluid with desired viscosity, and other fluid properties. For example, the drilling fluid may be prepared at a temperature range of about 150° F. to about 200° F., about 150° F. to about 165° F., about 165° F. to about 175° F., or from 175° F. to about 200° F.

In any embodiment, a portion of the components of the drilling fluid is from an existing treating fluid, such as a treating fluid recovered from the same or another well.

Additional components (e.g., an aqueous fluid, a modified starch, calcium carbonate, one or more additives) can be added to the recovered treating fluid to prepare the drilling fluid disclosed herein.

In any embodiment, the drilling fluid can be placed (e.g pumped) into a wellbore, during drilling operations, A method of servicing a wellbore penetrating a subterranean formation can include providing a drilling fluid of the type disclosed herein and circulating the drilling fluid from a surface (e.g., a well site) through a wellbore. The drilling fluid can be circulated back to the surface. In one or more aspects, the method further includes extending the wellbore in the subterranean formation while circulating the drilling fluid. The drilling fluid may be circulated through a drill string and bottom hole assembly. The drilling fluid may transfer kinetic energy into a mud motor to drive a drill bit on the end of the bottom hole assembly thereby extending the wellbore.

In any embodiment, the wellbore has a Bottomhole Static Temperature (BLAST) of from about 50° F. to about 350° F., alternatively from about 50° F. to about 325° F., alternatively from about 50° F. to about 300° F., alternatively from about 50° F. to about 275° F., or alternatively from about 50° F. to about 250° F.

In any embodiment, after the completion of drilling, the filter cake formed in the wellbore to prevent fluid loss may be dissolved to allow fluid injection. An acid breaker fluid can be placed into the wellbore to dissolve the filter cake present therein. The acid breaker fluid can include an acid, such as an acrylic acid, a methacrylic acid, a formic acid, a hydrochloric acid, or a combination thereof. Alternatively, the acid breaker fluid can include an acid precursor. An acid precursor can be capable of generating acid in the acid breaker fluid. For example, the acid breaker fluid can be been placed downhole and the acid precursor may covert in situ into an acid that contacts the filter cake and degrades and/or dissolves components thereof. Examples of acid precursors include, but are not limited to, one or more organic anhydrides such as an acetic anhydride, esters of organic acids, such as esters of a carboxylic acid or a sulfonic acid with glycols, polyols, alcohols, orthoesters such as a trimethyl orthoformate, a triethyl orthoformate, or a trimethyl orthoacetate, polyorthoesters, polyesters such as one or more of a polylactic acid), a poly(glycolic acid), lactones, or polylactones, all of which can form an organic acid when hydrolyzed. By way of example and not being bound by theory, an acetic anhydride can form an acetic acid when it is hydrolyzed. The acid breaker can also include halogen-containing compounds that can release inorganic strong acids such as a hydrochloric acid, a hydrobromic acid, or a hydroiodic acid. Examples of halogen-containing compounds include, but are not limited to, one or more alkyl halides, such as a methyl iodide or a t-butyl chloride, halide-containing aldehydes, ketones, carboxylic acids, esters, carboxylate salts, such as a chloroacetic acid, a sodium chloroacetate, a 3-chloropropanoic acid, or a sodium 3-chloropropanoate.

In some embodiments, the acid breaker fluid may include one or more one or more additional components or additives. For example, in any embodiment, the acid breaker fluid may include one or more polar organic solvents. In such embodiments, the polar organic solvent may improve the solubility of the acid breaker in aqueous base fluids. Suitable organic polar solvents in any embodiment may include one or more alcohols, glycols, glycol ethers, esters, amides, or their derivatives. Examples of organic polar solvents include, but are not limited to, methanol, ethanol, isopropanol, n-butanol, iso-butanol, tert-butanol, ethylene glycol, a polyethylene glycol, propylene glycol, butanediol, pentanediol, glycerol, a polyglycerol, 2-pyrrolidone, N-methyl-2-pyrrolidone, ethylene glycol monobutyl ether, diethylene glycol monobutyl ether, one or more polyglycol ethers, or combinations thereof. In some embodiments, the polar organic solvent may be present in the acid breaker fluid in an amount up to about 70%, by volume, of the acid breaker fluid, additionally or alternatively, from about 1% to about 50%, by volume, additionally or alternatively, from about 2% to about 40%, by volume, or additionally or alternatively, from about 5% to about 30%, by volume, of the acid breaker fluid.

Additionally or alternatively, in any embodiment, the acid breaker fluid may include one or more surfactants. The surfactants can be capable of converting a water-in-oil emulsion in the filter cake to a more easily cleaned on-in-water emulsion. In any embodiment, suitable surfactants may be, independently, at least one of a cationic surfactant, an anionic surfactant, a zwitterionic surfactant, a nonionic surfactant, or a combination thereof. Examples of a cationic surfactant suitable in any embodiment may be, independently, one or more alkyl amines, alkyl amine salts, quaternary ammonium salts, such as one or more trimethyltallowammonium halides (e.g., a trimethyltallowammonium chloride or a trimethyltallowammonium bromide), amine oxides, alkyltri ethyl amines, triethyl amines, alkyldimethylbenzylamines, a cetyltrimethylammonium bromide, an alkyl dimethyl benzyl-ammonium chloride, a trimethylcocoammonium chloride, derivatives thereof, or combinations thereof. Examples of suitable anionic surfactants in any embodiment may be, independently, one or more alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, $C_8$ to $C_{22}$ alkylethoxylate sulfate, an alkylphenol ethoxylate sulfate (or a salt thereof), monoalkylphosphates, polyalkylphosphates, fatty acids, alkali salts of fatty acids, glyceride sulfates, sodium salts of fatty acids, soaps, derivatives thereof, or combinations thereof. Examples of suitable one or more amphoteric or zwitterionic surfactants in any embodiment may be a dihydroxyl alkyl glycinate, an alkyl amphoacetate, a propionate, an alkyl betaine, an alkyl amidopropyl betaine, or an alkylimino mono- or di-propionate derived from one or more waxes, fats or oils. Examples of one or more suitable nonionic surfactants in any embodiment may be, independently, one or more alcohol oxylalkylates, alkyl phenol oxylalkylates, nonionic esters, such as sorbitan esters alkoxylates of sorbitan esters, castor oil alkoxylates, fatty acid alkoxylates, lauryl alcohol alkoxylates, nonylphenol alkoxylates, octylphenol alkoxylates, a tridecyl alcohol alkoxylate, an alkyl polyglucoside, derivatives thereof, or combinations thereof. In any embodiment, the surfactant in the acid breaker fluid may be in an amount up to about 2.0%, by volume, of the acid breaker fluid, additionally or alternatively, from about 0.01% to about 2.0%, by volume, additionally or alternatively, from about 0.2% to about 1.5%, by volume, or additionally or alternatively, from about 0.5% to about 1.0%, by volume, of the acid breaker fluid.

Afterwards (e.g., after drilling and an acidization treatment such as filter cake removal), a secondary hydrocarbon recovery operation can be conducted, such as a flooding operation. In any embodiment, a suitable treatment fluid can be placed (e.g., pumped) into the well and/or surrounding formation. A treatment fluid can include may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension. In any embodiment, the pH of the aqueous fluid may be adjusted (e.g., by a buffer or other pH adjusting agent) to a specific level, which may depend on, among other factors, the types of viscosifying agents, acids and other additives included in the fluid. One of ordinary skill in the art, with the benefit of this disclosure, will recognize when such density and/or pH adjustments are appropriate. A treatment fluid can be used in a water flood operation to drive, e.g., one or more hydrocarbons, towards a production well for recovering the hydrocarbons.

As further described in FIG. 1 below, the drilling fluid may be generally cleaned and reused throughout a drilling operation. The drilling fluid may be cleaned of solids and drill cuttings and recycled back into the drill string. The additional oil or aqueous fluid may be added at any time during the fluid handling process to increase or decrease the density. For example, without limitation, the additional oil or aqueous fluid may be added in an inline mixer, to storage tanks including the drilling fluid, in the mud pit, or any other point in the fluid handling system.

Drilled solids, which become entrained in the fluid, may be removed by various means, which are well known in the art. Shale shakers with select screen mesh sizes can often be the most widely-used separation tools. These can be augmented with centrifuges having varying spool and bowl sizes and rotational speeds to further remove fine solids. Separation of solids by these means can allow for additional use of a given fluid, with lower requirements for liquid dilution to keep a constant density.

FIG. 1 illustrates an exemplary drilling assembly 100 in which a drilling fluid 122, such as a drilling fluid disclosed herein, may be used. It should be noted that while FIG. 1 generally depicts a land-based drilling assembly, the principles described herein are equally applicable to subsea drilling operations that employ floating or sea-based platforms and rigs, without departing from the scope of the disclosure.

As illustrated, the drilling assembly 100 may include a drilling platform 102 that may support a derrick 104 having a traveling block 106 for raising and lowering a drill string 108, wherein the drill string 108 may have a proximal end 113 and a distal end 111. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end 111 of the drill string 108, wherein the drill bit 114 may be driven either by a downhole motor and/or via rotation of the drill string 108 from the well surface 10. The drill bit 114 may include, but is not limited to, roller cone bits, polycrystalline diamond compact (PDC) bits, natural diamond bits, any hole openers, reamers, coring bits, etc. As the drill bit 114 rotates, it may create a wellbore 116 that may penetrate various subterranean formations 118. In any embodiment, the drill bit 114 can pass through a non-production zone 30 and then to a fluid, such as a hydrocarbon, production zone 34. What is more, the drill bit 114 can pass a first location 20, a second location 24, and a third location 28. Although the locations are depicted vertically, it should be understood that one or more of the locations may be positioned horizontally with respect to the other locations. After the drill bit 114 reaches the desired location, a well, such as an injector well 50, can be formed.

A drilling fluid 122, such as an aqueous drilling fluid, may be prepared. A pump 120, such as a mud pump, may circulate drilling fluid 122 through a feed pipe 124 and to the kelly 110, which conveys the drilling fluid 122 downhole through the interior of the drill string 108 and through one or more orifices in the drill bit 114, The drilling fluid 122 may then be circulated back to the surface 10 via an annulus 126 defined between the drill string 108 and the walls of the wellbore 116. At the surface 10, the recirculated or spent drilling fluid 122 may exit the annulus 126 and may be conveyed to one or more fluid processing unit(s) 128 via an interconnecting flow line 130. The fluid processing unit(s) 128 may include, but may not limited to, one or more of a shaker, wherein the shaker may be a shale shaker, for example, a centrifuge, a hydrocyclone, a separator (e.g., one or more magnetic and electrical separators), a desilter, a desander, a filter, wherein the filter may be a diatomaceous earth filter, for example, a heat exchanger, and/or any fluid reclamation equipment. The fluid processing unit(s) 128 may further include one or more sensors, gauges, pumps, compressors and the like, used store, monitor, regulate and/or recondition the drilling fluid 122.

After passing through the fluid processing unit(s) 128, a "cleaned" drilling fluid 122 may be deposited into a nearby retention pit 132, wherein the retention pit may be a mud pit, for example. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there may be more than one retention pit 132, such as multiple retention pits 132 in series. Moreover, the retention pit 132 may be representative of one or more fluid storage facilities and/or units where the drilling fluid additives may be stored, reconditioned, and/or regulated until being added to the drilling fluid 122. After the wellbore 116 is formed and cleaned for injecting treatment fluids, a treatment fluid can be injected into the production zone 34 to allow the treatment fluid to migrate in a direction 40 towards a production well for recovering, e.g., one or more hydrocarbons.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. Moreover, the disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors, wherein the motors may be topside or downhole motors, for example, used to drive the drilling fluids into motion, any valves or elated joints used to regulate the pressure or flow rate of the drilling fluids, and any sensors, such as pressure sensors or temperature sensors, gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats, such as shoes, collars, or valves, for example, logging tools and related telemetry equipment, actuators, such as electromechanical devices, for example, hydromechanical devices, etc.), sliding sleeves, production sleeves, plugs, screens, filters, flow control devices, such as inflow control devices, autonomous inflow control devices, or outflow control devices, for example, couplings, wherein the couplings may include electro-hydraulic wet connect, dry connect, or inductive coupler, for example, control lines, such as electrical lines, fiber optic lines, or hydraulic lines, for example, surveillance lines drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

The aspects having been generally described, the following examples are given as particular aspects of the disclosure and to demonstrate the practice and advantages thereof. It is understood that the examples are given by way of illustration and are not intended to limit the specification or the claims in any manner.

Example 1

Four drilling fluid samples are prepared according to the formulations in Table 1. The components are added in certain order and amounts to obtain concentrations in pound per barrel (lb/bbl) as depicted in Table 1. Samples 1, 2, 3, and 4 have the same compositions except that calcium carbonate of differing particle size as indicated by median diameter ($d_{50}$) of the particle size distribution.

Thus, the fluid's rheological properties can be modified by using the combination of sized calcium carbonate and modified starch. The significant and unexpected results can be achieved with the required fluid properties (thick/thin) by just varying the particle size distribution (PSD) of the calcium carbonate and the starch concentration in the fluid can be limited for the required infectivity. The rheology measurements can be measured with a viscometer sold under the trade designation Model 45 APV by Fann Instrument Company of Houston, Tex. Fluid formulations including a modified starch and four different calcium carbonate PSD sample to create four respective samples that are fluid mixed on a multimixer and hot rolled at 150° F., are depicted in TABLE 1:

TABLE 1

| Components in order of addition Pound per barrel (lb/bbl) | Mix time, minute (min) | Sample 1 Calcium Carbonate ($d_{50}$ = 8.3 μm) | Sample 2 Calcium Carbonate ($d_{50}$ = 9.8 μm) | Sample 3 Calcium Carbonate ($d_{50}$ = 11.9 μm) | Sample 4 Calcium Carbonate ($d_{50}$ = 21.4 μm) |
|---|---|---|---|---|---|
| Potassium Chloride Brine 1.17 specific gravity (sg), lb/bbl | 5 | 193.2 | 193.2 | 193.2 | 193.2 |
| Water 1.00 sg, lb/bbl | | 145 | 145 | 145 | 145 |
| Magnesium Oxide Buffer, lb/bbl | | 3 | 3 | 3 | 3 |
| Modified Starch, lb/bbl | 10 | 11 | 11 | 11 | 11 |
| Quaternary Amine Stabilizer, lb/bbl | 5 | 11.5 | 11.5 | 11.5 | 11.5 |
| Calcium Carbonate, lb/bbl | 5 | 49.1 | 49.1 | 49.1 | 49.1 |
| Rheology at 120° F., Viscometer FANN ® 45 | | After Hot Rolling (AHR) | AHR | AHR | AHR |
| 600 rpm | | 67 | 61 | 53 | 46 |
| 300 rpm | | 54 | 46 | 37 | 30 |
| 200 rpm | | 47 | 39 | 30 | 24 |
| 100 rpm | | 38 | 31 | 22 | 16 |
| 6 rpm | | 19 | 14 | 6 | 3 |
| 3 rpm | | 16 | 12 | 5 | 3 |
| Plastic Viscosity, centipoise (cP) | | 13 | 15 | 16 | 16 |
| Yield Point, pound per 100 feet squared (lb/100 ft²) | | 41 | 31 | 21 | 14 |

Figure 2:
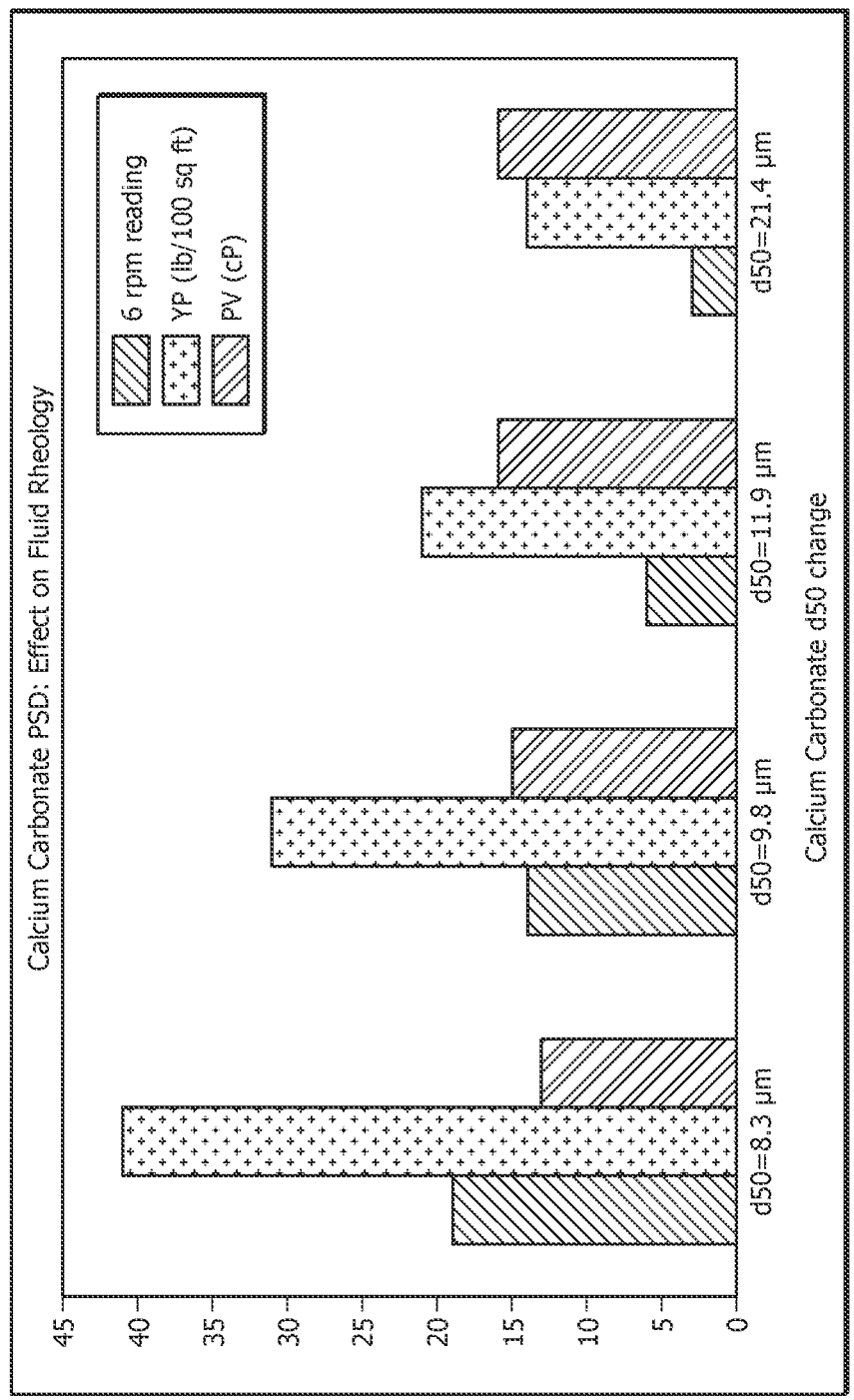
FIG. 2 is a graphical depiction of some of the data of Table 1 depicted hereinafter.

Varying the $d_{50}$ size of calcium carbonate in Samples 1-4 from 8.3 μm to 21.4 μm changes the 6 rpm rheology reading from 19 to 3 and the yield point value from 41 (lb/100 ft²) to 14 (lb/100 ft²), as depicted in FIG. 2. There is no significant change in plastic viscosity as the total weight of the solid is same in the formulation. Also, the injectivity for all starch-based fluid is above 70%. Thus, the synergistic effect between modified starch and sized calcium carbonate can aid modifying the fluid rheology by changing the particle size of the calcium carbonate in the fluid with desired return injectivity numbers depending on the desired characteristics.

Example 2

Additional drilling fluids can be based on cellulose derivatives such as diutan gum and starch and are combined with a multimixer and hot rolled at 150° F., as depicted in Table 2.

| Components in order of addition | Mix time, min | Sample 5 Calcium Carbonate ($d_{50}$ = 8.3 μm) | Sample 6 Calcium Carbonate ($d_{50}$ = 11.9 μm) |
|---|---|---|---|
| Potassium Chloride Brine 1.15 sg. lb/bbl | 5 | 193.2 | 193.2 |

-continued

| Components in order of addition | Mix time, min | Sample 5 Calcium Carbonate ($d_{50}$ = 8.3 μm) | Sample 6 Calcium Carbonate ($d_{50}$ = 11.9 μm) |
|---|---|---|---|
| Water 1.00 sg, lb/bbl | | 156 | 156 |
| Magnesium Oxide Buffer, lb/bbl | | 0.25 | 0.25 |
| Soda Ash, lb/bbl | 5 | 0.25 | 0.25 |
| Fluid loss control agent, lb/bbl | 10 | 8 | 8 |
| Viscosifier, lb/bbl | 10 | 0.2 | 0.2 |
| Delayed Breaker, lb/bbl | 5 | 2 | 2 |
| Calcium Carbonate, lb/bbl | 5 | 53.36 | 53.36 |
| Biocide | In cell | 0.35 | 0.35 |
| Properties, Rheology at 120° F. | | AHR | AHR |
| 600 rpm | | 56 | 41 |
| 300 rpm | | 44 | 29 |
| 200 rpm | | 38 | 24 |
| 100 rpm | | 30 | 18 |
| 6 rpm | | 15 | 7 |
| 3 rpm | | 14 | 6 |
| Plastic Viscosity, cP | | 12 | 12 |
| Yield Point, lb/100 ft² | | 32 | 17 |

The change in particle size distribution as indicated by $d_{50}$ of the calcium carbonate samples from 8.3 μm to 1.1.9 μm changes the 6 rpm rheology reading from 15 to 7 and yield point (lb/100 ft²) from 32 to 17. However, plastic viscosity is comparable for both the fluids. Although not wanting to be bound by theory, the injectivity is less than 30% due to presence of diutan based gum product as the viscosifier having poor dissolution in acid while the starch can serve as the fluid loss control agent. Thus, the fluid rheological properties can be optimized by selecting the desired particle size distribution of calcium carbonate, but to get the desired return injectivity, a fluid absent xanthan gum or diutan gum can be selected. Thus, the significant and unexpected results of calcium carbonate particle size and modified starch can after fluid properties (thin/thick fluid) to adjust to wellbore conditions. The optimum concentration of modified starch can be optimized in the fluid formulation to obtain desired fluid loss attributes and viscosity performance. This fluid system can be used for injector wells to meet required injectivity performance.

Additional Disclosure

The following are non-limiting, specific embodiments in accordance with the present disclosure:

A first embodiment, which is a method of drilling a wellbore for an injector well penetrating a subterranean formation, the method comprising during the drilling operations, circulating in the wellbore a first aqueous drilling fluid composition comprising a modified starch and a calcium carbonate wherein the calcium carbonate has a first predetermined particle size; during the circulating, measuring one or more parameters of the first aqueous drilling fluid composition, one or more parameters of the formation, or both; and during the circulating, responsive to the one or more measured parameters, changing the calcium carbonate with another calcium carbonate of a second predetermined particle size different from the first predetermined particle size of the first aqueous drilling fluid composition to obtain a second aqueous drilling fluid composition.

A second embodiment, which is the method of the first embodiment, wherein the one or more formation parameters comprises a well depth, a formation porosity, a formation pore throat size, a formation pressure, a formation temperature, or a combination thereof.

A third embodiment, which is the method of any of the first and second embodiments, wherein the one or more aqueous drilling fluid composition parameters comprises a fluid rheology, a top brine separation after static aging, a low temperature and low pressure (LTLP) fluid loss, a high temperature and high pressure (HTHP) fluid loss, a permeability plugging apparatus fluid loss, or a combination thereof.

A fourth embodiment, which is the method of any of the first through third embodiments, wherein the first and second aqueous drilling fluid compositions further comprise a pH buffer, water, mono-valent and di-valent brine and a stabilizer.

A fifth embodiment, which is the method of any of the first through fourth embodiments, wherein the first and second aqueous drilling fluid compositions exclude a xanthan gum and a diutan gum.

A sixth embodiment, which is the method of any of the first through fifth embodiments, wherein the modified starch provide viscosity and fluid loss control properties to the first and second aqueous drilling fluid compositions.

A seventh embodiment, which is the method of any of the first through sixth embodiments, wherein the first and second predetermined particle sizes are, independently, a $d_{50}$ particle size of about 1.0 μm to about 150 μm.

An eighth embodiment, which is the method of any of the first through seventh embodiments, wherein the first and second predetermined particle sizes are, independently, a $d_{50}$ particle size of about 7.0 μm to about 25 μm.

A ninth embodiment, which is the method of any of the first through eighth embodiments, wherein the modified starch comprises a number of one or more multi-functional crosslinking agents.

A tenth embodiment, which is the method of any of the first through ninth embodiments, wherein the first and second aqueous drilling fluid compositions comprise a plastic viscosity of about 5 to about 40 centipoise or about 10 to about 20 centipoise.

An eleventh embodiment, which is the method of any of the first through tenth embodiments, wherein the first and second aqueous drilling fluid compositions comprise a yield point of about 0.1 to about 10 kg/m².

A twelfth embodiment, which is the method of any of the first through eleventh embodiments, further comprising injecting a solution comprising a breaker fluid for removing a residue deposited on the surface of the well.

A thirteenth embodiment, which is the method of any of the first through twelfth embodiments, further comprising during the circulating, responsive to the one or more measured parameters, changing a first amount of calcium carbonate to a second amount of calcium carbonate that is different from the first amount.

A fourteenth embodiment, which is the method of any of the first through thirteenth embodiments, further comprising injecting a treatment fluid into the wellbore and allowing the treatment fluid to migrate into the subterranean formation in a direction of a production well.

A fifteenth embodiment, which is the method of any of the first through fourteenth embodiments, wherein the first composition is used to drill a portion of the wellbore located above a hydrocarbon production zone of the subterranean formation and the second composition is used to drill a portion of the wellbore located in the hydrocarbon production zone of the subterranean formation.

A sixteenth embodiment, which is a method of drilling a wellbore penetrating a subterranean formation, the method comprising during drilling operations, circulating in the wellbore an aqueous drilling fluid composition comprising a modified starch and a calcium carbonate in a fluid production zone wherein the calcium carbonate has a predetermined particle size; and providing a calcium carbonate of another predetermined particle size different from the predetermined particle size to obtain another aqueous drilling fluid composition depending on one or more measured aqueous drilling fluid or formation parameters wherein the another aqueous drilling fluid composition has a calcium carbonate particles size different from the aqueous drilling fluid composition.

A seventeenth embodiment, which is the method of the sixteenth embodiment, wherein the one or more formation parameters comprises a well depth, a formation porosity, a formation pore throat size, a formation pressure, a formation temperature, or a combination thereof.

An eighteenth embodiment, which is the method of any of the sixteenth through seventeenth embodiments, wherein the one or more aqueous drilling fluid composition parameters comprises a fluid rheology, a top brine separation after static aging, a low temperature and low pressure (LTLP) fluid loss, a high temperature and high pressure (HTHP) fluid loss, a permeability plugging apparatus fluid loss, or a combination thereof.

A nineteenth embodiment, which is the method of any of the sixteenth through eighteenth embodiments, wherein the aqueous drilling fluid compositions further comprise a pH buffer, water, and a stabilizer.

A twentieth embodiment, which is the method of any of the sixteenth through nineteenth embodiments, wherein the modified starch excludes a xanthan gum and a diutan gum.

An twenty-first embodiment, which is the method of any of the sixteenth through twentieth embodiments, wherein the aqueous drilling fluid compositions have an injectivity of at least about 70%.

A twenty-second embodiment, which is the method of any of the sixteenth through twenty-first embodiments, wherein the aqueous drilling fluid compositions exclude a viscosifier.

A twenty-third embodiment, which is the method of any of the sixteenth through twenty-second embodiments, wherein the predetermined particle sizes are, independently, a $d_{50}$ particle size of about 5.0 µm to about 30 µm.

A twenty-fourth embodiment, which is the method of any of the sixteenth through twenty-third embodiments, wherein the predetermined particle size are, independently, a $d_{50}$ particle size of about 7.0 µm to about 25 µm.

A twenty-fifth embodiment, which is the method of any of the sixteenth through twenty-fourth embodiments, wherein the modified starch comprises a number of one or more multi-functional crosslinking agents.

A twenty-sixth embodiment, which is the method of any of the sixteenth through twenty-fifth embodiments, wherein the aqueous drilling fluid compositions comprise a plastic viscosity of about 5 to about 40 centipoise or about 10 to about 20 centipoise.

A twenty-seventh embodiment, which is the method of any of the sixteenth through twenty-six embodiments, wherein the aqueous drilling fluid compositions comprise a yield point of about 0.1 to about 10 kg/m².

A twenty-eighth embodiment, which is a method of drilling a wellbore penetrating a subterranean formation, the method comprising drilling the wellbore in a fluid non-production zone while circulating a first drilling fluid composition; continuing drilling the wellbore in a fluid production zone while circulating a second drilling fluid composition comprising a modified starch and a calcium carbonate formulated to minimize damage to the formation wherein the calcium carbonate has a predetermined particle size, wherein the first drilling fluid composition has a calcium carbonate predetermined particle size different from the second drilling fluid composition.

A twenty-ninth embodiment, which is the method of the twenty-eighth embodiment, wherein the one or more formation parameters comprises a well depth, a formation porosity, a formation pore throat size, a formation pressure, a formation temperature, or a combination thereof.

A thirtieth embodiment, which is the method of any of the twenty-eighth through twenty-ninth embodiments, wherein the one or more aqueous drilling fluid composition parameters comprises a fluid rheology, a top brine separation after static aging, a low temperature and low pressure (LTLP) fluid loss, a high temperature and high pressure (HTHP) fluid loss, a permeability plugging apparatus fluid loss, or a combination thereof.

A thirty-first embodiment, which is the method of any of the twenty-eighth through thirtieth embodiments, wherein the first and second aqueous drilling fluid compositions further comprise a pH buffer, water, and a stabilizer.

A thirty-second embodiment, which is the method of any of the twenty-eighth through thirty-first embodiments, wherein the modified starch excludes a xanthan gum and a diutan gum.

A thirty-third embodiment, which is the method of any of the twenty-eighth through thirty-second embodiments, wherein the first and second aqueous drilling fluid compositions have an injectivity of at least about 70%.

A thirty-fourth embodiment, which is the method of any of the twenty-eighth through thirty-third embodiments, wherein the first and second aqueous drilling fluid compositions exclude a viscosifier.

A thirty-fifth embodiment, which is the method of any of the twenty-eighth through thirty-fourth embodiments, wherein the predetermined particle size is a $d_{50}$ particle size of about 5.0 µm to about 30 µm.

A thirty-sixth embodiment, which is the method of any of the twenty-eighth through thirty-fifth embodiments, wherein the predetermined particle size is a $d_{50}$ particle size of about 7.0 µm to about 25 µm.

A thirty-seventh embodiment, which is the method of any of the twenty-eighth through thirty-sixth embodiments, wherein the modified starch comprises a number of one or more multi-functional crosslinking agents.

A thirty-eighth embodiment, which is the method of any of the twenty-eighth through thirty-seventh embodiments, wherein the first and second aqueous drilling fluid compositions comprise a plastic viscosity of about 5 to about 40 centipoise or about 10 to about 20 centipoise.

A thirty-ninth embodiment, which is the method of any of the twenty-eighth through thirty-eighth embodiments, wherein the first and second aqueous drilling fluid compositions comprise a yield point of about 0.1 to about 10 kg/m².

A fortieth embodiment, which is the method of any of the twenty-eighth through thirty-ninth embodiments, further comprising injecting a solution comprising acid for removing a residue deposited from a surface of the well.

A forty-first embodiment, which is the method of any of the twenty-eighth through fortieth embodiments, wherein the drilling operations comprise a secondary hydrocarbon recovery operation.

A forty-second embodiment, which is the method of any of the twenty-eighth through forty-first embodiments, further comprising injecting an enhanced recovery fluid for the secondary hydrocarbon recovery in the one or more injection wells to direct one or more hydrocarbons to the production well to produce the one or more hydrocarbons.

A forty-third embodiment, which is the method of any of the twenty-eighth through forty-second embodiments, wherein the secondary hydrocarbon recovery operations comprise a water flood operation.

A forty-fourth embodiment, which is a method of drilling a wellbore penetrating a subterranean formation, the method comprising drilling the wellbore to a first location in a non-production zone of the subterranean formation while circulating a first drilling fluid composition having a first bridging agent with a first predetermined particle size; and drilling the wellbore to a second location in a production zone of the subterranean formation while circulating a second drilling fluid composition having a second bridging agent with a second predetermined particle size; wherein the second location is downhole the first location, the first bridging agent transitions to the second bridging agent as the second bridging agent is added to the drilling fluid at the surface, and an amount of the bridging agent in the first and second drilling fluid compositions is substantially constant.

A forty-fifth embodiment, which is the method of the forty-fourth embodiment, further comprising adding at the surface the bridging agent comprising a calcium carbonate having the first predetermined particle size to the first drilling fluid composition while drilling the wellbore; adding at the surface a calcium carbonate having the second predetermined particle size instead of the first predetermined particle to create a transitory drilling fluid composition and pumping the transitory drilling fluid composition into the wellbore; and continuing to add at the surface the calcium carbonate having the second predetermined particle size to obtain the second drilling fluid composition and pumping the second drilling fluid composition into the wellbore at the second location.

A forty-six embodiment, which is a method of drilling a wellbore for an injector well penetrating a subterranean formation, the method comprising during the drilling operations, circulating in the wellbore a first aqueous drilling fluid composition comprising a modified starch and a first amount of calcium carbonate wherein the calcium carbonate has a first predetermined particle size; during the circulating, measuring one or more parameters of the first aqueous drilling fluid composition, one or more parameters of the formation, or both; and during the circulating, responsive to the one or more measured parameters, changing (i) the first amount of calcium carbonate to a second amount of calcium carbonate that is different from the first amount, (ii) the first predetermined particle size of the calcium carbonate to a second predetermined particle size that is different from the first predetermined particle size, or (iii) both (i) and to obtain a second aqueous drilling fluid corn position.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method of drilling a wellbore for an injector well penetrating a subterranean formation, the method comprising:
during drilling operations, circulating in the wellbore a first aqueous drilling fluid composition comprising a modified starch and a calcium carbonate wherein the calcium carbonate has a first predetermined particle size;
during the circulating, measuring one or more first aqueous drilling fluid composition parameters, one or more subterranean formation parameters, or both to create a set of measured parameters; and
during the circulating, responsive to one or more parameters of the set of measured parameters, changing the calcium carbonate with another calcium carbonate of a second predetermined particle size different from the first predetermined particle size of the first aqueous drilling fluid composition to obtain a second aqueous drilling fluid composition,
wherein the first predetermined particle size and second predetermined particle size are, independently, a $d_{50}$ particle size of about 1.0 μm to about 150 μm.

2. The method of claim 1, further comprising:
during the circulating, responsive to the set of measured parameters, changing a first amount of calcium carbonate to a second amount of calcium carbonate that is different from the first amount.

3. The method of claim 1, wherein the one or more subterranean formation parameters comprises a well depth, a formation porosity, a formation pore throat size, a formation pressure, a formation temperature, or a combination thereof.

4. The method of claim 1, wherein the one or more first aqueous drilling fluid composition parameters comprises a result of a fluid rheology, a top brine separation after static aging, a low temperature and low pressure (LTLP) fluid loss, a high temperature and high pressure (HTHP) fluid loss, a permeability plugging apparatus fluid loss, or a combination thereof.

5. The method of claim 1, wherein the first aqueous drilling fluid composition and the second aqueous drilling fluid composition further comprise a pH buffer, water, at least one of a mono-valent and di-valent brine, and a stabilizer.

6. The method of claim 1, wherein the first aqueous drilling fluid composition and the second aqueous drilling fluid composition exclude a xanthan gum or a diutan gum.

7. The method of claim 1, wherein the modified starch provides viscosity and fluid loss control properties to the first aqueous drilling fluid composition and the second aqueous drilling fluid composition.

8. The method of claim 1, wherein the first predetermined particle size and the second predetermined particle size are, independently, a $d_{50}$ particle size of about 7.0 μm to about 25 μm.

9. The method of claim 8, wherein the first aqueous drilling fluid composition and the second aqueous drilling fluid composition provide a return injectivity of greater than about 70% compared to fluids based on diutan gum and starch.

10. The method of claim 1, wherein the first aqueous drilling fluid composition and the second aqueous drilling fluid composition comprise a plastic viscosity of about 5 to about 40 centipoise.

11. The method of claim 1, wherein the first aqueous drilling fluid composition and the second aqueous drilling fluid composition comprise a yield point of about 0.1 to about 10 kg/m².

12. The method of claim 1, further comprising injecting a solution comprising a breaker fluid for removing a residue deposited on a surface of the injector well.

13. The method of claim 12, further comprising injecting a treatment fluid into the wellbore of the injector well and allowing for migrating the treatment fluid to migrate into the subterranean formation in a direction of a production well.

14. The method of claim 1, wherein the first aqueous drilling fluid composition is used to drill a portion of the wellbore located above a hydrocarbon production zone of the subterranean formation and the second aqueous drilling fluid composition is used to drill a portion of the wellbore located in the hydrocarbon production zone of the subterranean formation.

15. The method of claim 1, wherein the first aqueous drilling fluid composition and the second aqueous drilling fluid composition provide a return injectivity of greater than about 70% compared to fluids based on diutan gum and starch.

16. A method of drilling a wellbore for an injector well penetrating a subterranean formation, the method comprising:
during drilling operations, circulating in the wellbore a first aqueous drilling fluid composition comprising a modified starch and a calcium carbonate wherein the calcium carbonate has a first predetermined particle size;
during the circulating, measuring one or more first aqueous drilling fluid composition parameters, one or more subterranean formation parameters, or both to create a set of measured parameters;
during the circulating, responsive to one or more parameters of the set of measured parameters, changing the calcium carbonate with another calcium carbonate of a second predetermined particle size different from the first predetermined particle size of the first aqueous drilling fluid composition to obtain a second aqueous drilling fluid composition;
injecting a solution comprising a breaker fluid for removing a residue deposited on a surface of the injector well; and
injecting a treatment fluid into the wellbore of the injector well for migrating the treatment fluid into the subterranean formation in a direction of a production well,
wherein the first and second predetermined particle sizes are, independently, a $d_{50}$ particle size of about 1.0 μm to about 150 μm.

17. The method of claim 16, wherein the first aqueous drilling fluid composition and the second aqueous drilling fluid composition provide a return injectivity of greater than about 70% compared to fluids based on diutan gum and starch.

18. The method of claim 16, wherein the first predetermined particle size and the second predetermined particle size are, independently, a $d_{50}$ particle size of about 7.0 μm to about 25 μm.

19. The method of claim 16, wherein the first aqueous drilling fluid composition and the second aqueous drilling fluid composition comprise a plastic viscosity of about 5 to about 40 centipoise.

20. The method of claim 16, wherein the first aqueous drilling fluid composition and the second aqueous drilling fluid composition comprise a yield point of about 0.1 to about 10 kg/m².

* * * * *